(12) United States Patent
Karlsson et al.

(10) Patent No.: US 9,213,984 B2
(45) Date of Patent: *Dec. 15, 2015

(54) SYSTEM IDENTIFICATION, ESTIMATION, AND PREDICTION OF ADVERTISING-RELATED DATA

(71) Applicant: Mercury Kingdom Assets Limited, Road Town, Tortola (VG)

(72) Inventors: Niklas Karlsson, Mountain View, CA (US); Jaime Batiz-Mendoza, Sunnyvale, CA (US); Jianlong Zhang, Mountain View, CA (US)

(73) Assignee: Mercury Kingdom Assets Limited, Road Town, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,166

(22) Filed: Oct. 17, 2014

(65) Prior Publication Data
US 2015/0142554 A1   May 21, 2015

Related U.S. Application Data

(63) Continuation of application No. 14/194,985, filed on Mar. 3, 2014, now Pat. No. 8,972,305, which is a continuation of application No. 13/935,758, filed on Jul. 5, 2013, now Pat. No. 8,719,189, which is a
(Continued)

(51) Int. Cl.
*G06F 17/00* (2006.01)
*G06N 5/02* (2006.01)
*G06Q 30/02* (2012.01)

(52) U.S. Cl.
CPC ............ *G06Q 30/0243* (2013.01); *G06Q 30/02* (2013.01); *G06Q 30/0241* (2013.01); *G06Q 30/0242* (2013.01); *G06Q 30/0246* (2013.01)

(58) Field of Classification Search
USPC .......................................................... 706/45
See application file for complete search history.

(56) References Cited

U.S. PATENT DOCUMENTS

| 7,039,598 B2 | 5/2006 | Tobin et al. |
| 7,085,682 B1 | 8/2006 | Heller et al. |

(Continued)

OTHER PUBLICATIONS

A novel approach for location promotion on location-based social networks, Nguyen Thanh Hai Computing & Communication Technologies—Research, Innovation, and Vision for the Future (RIVF), 2015 IEEE RIVF International Conference on Year: 2015 pp. 53-58, DOI: 10.1109/RIVF.2015.7049874 Referenced in: IEEE Conference Publications.*

(Continued)

*Primary Examiner* — Michael B Holmes
(74) *Attorney, Agent, or Firm* — Lee & Hayes, PLLC

(57) ABSTRACT

In accordance with the invention, a system, method, and apparatus for analyzing advertisement-related data are presented, which may include receiving data related to an aspect of an advertisement and modeling the aspect of the advertisement with a mathematical model. The mathematical model may include a control-signal-related component, a control-signal-independent component, and an error component. Each component may be updated based on at least one of a control signal, the received data, and a previous state of at least one of the components. An updated model may be created base on the updated components. The system, method, and apparatus may also include predicting the aspect of the advertisement using the updated model. Exemplary aspects of and data related to the advertisement may include one or more of the following: a number of impressions, "clicks," or "conversions" and/or the impression-to-conversion, impression-to-click, or click-to-conversion ratios.

20 Claims, 6 Drawing Sheets

Related U.S. Application Data continuation of application No. 13/370,852, filed on Feb. 10, 2012, now Pat. No. 8,498,955, which is a continuation of application No. 12/898,258, filed on Oct. 5, 2010, now Pat. No. 8,121,963, which is a continuation of application No. 12/155,442, filed on Jun. 4, 2008, now Pat. No. 7,827,128, which is a continuation of application No. 11/801,861, filed on May 11, 2007, now abandoned.

(56) References Cited

U.S. PATENT DOCUMENTS

| | | | |
|---|---|---|---|
| 7,158,886 B2 | 1/2007 | Hou et al. | |
| 7,251,589 B1 | 7/2007 | Crowe et al. | |
| 7,319,973 B1 | 1/2008 | Tobin et al. | |
| 7,349,827 B1 | 3/2008 | Heller et al. | |
| 7,457,823 B2 | 11/2008 | Shraim et al. | |
| 7,460,065 B2 | 12/2008 | Ogawa et al. | |
| 7,523,085 B2 | 4/2009 | Nigam et al. | |
| 7,596,552 B2 | 9/2009 | Levy et al. | |
| 7,600,017 B2 | 10/2009 | Holtzman et al. | |
| 7,660,783 B2 | 2/2010 | Reed | |
| 7,698,335 B1 | 4/2010 | Vronay | |
| 7,711,808 B2 | 5/2010 | Parry | |
| 7,725,414 B2 | 5/2010 | Nigam et al. | |
| 7,730,120 B2 | 6/2010 | Singh et al. | |
| 7,739,335 B2 | 6/2010 | Siegel et al. | |
| 7,827,128 B1 * | 11/2010 | Karlsson | G06Q 30/02 706/21 |
| 7,835,937 B1 * | 11/2010 | Karlsson | G06Q 30/02 705/7.31 |
| 7,835,938 B1 * | 11/2010 | Karlsson | G06Q 30/02 705/7.31 |
| 7,835,939 B1 * | 11/2010 | Karlsson | G06Q 30/02 705/7.31 |
| 7,835,987 B2 | 11/2010 | Daley et al. | |
| 8,121,963 B2 * | 2/2012 | Karlsson | G06Q 30/02 706/21 |
| 8,498,955 B2 * | 7/2013 | Karlsson | G06Q 30/02 706/45 |
| 8,719,189 B2 * | 5/2014 | Karlsson | G06Q 30/02 706/5 |
| 8,972,305 B2 * | 3/2015 | Karlsson | G06Q 30/02 706/5 |
| 9,002,774 B2 * | 4/2015 | Karlsson | G06Q 10/04 706/52 |
| 2002/0165756 A1 | 11/2002 | Tobin et al. | |
| 2012/0136715 A1 | 5/2012 | Karlsson et al. | |
| 2014/0006143 A1 | 1/2014 | Karlsson et al. | |
| 2014/0180789 A1 | 6/2014 | Karlsson et al. | |

OTHER PUBLICATIONS

Design and implementation of Taxi advertisement system, Yu-Chia Hsu; Chih-Sheng Wang; Shih-Fan Chou; Ai-Chun Pang; Pi-Chen Chiu; Shu-Jye Chang Electrical Engineering and Computer Science (ICEECS), 2014 International Conference on Year: 2014 pp. 1-6, DOI: 10.1109/ICEECS.2014.7045209 Referenced in: IEEE Conference Publications.*

Effective models to predict customers' responses to interactive audio advertisements Shengqiang Chen; Lu Liu; Fuyuan Wang; Guadagni, G. Systems and Information Engineering Design Symposium (SIEDS), 2015 Year: 2015 pp. 289-294, DOI: 10.1109/SIEDS.2015.7116991 Referenced in: IEEE Conference Publications.*

Kostur, P., "Information Modeling for Single Sourcing", Professional Communication Conference, 2000., Proceedings of 2000 Joint IEEE International and 18th Annual Conference on Computer Documentation (IPCC/SIGDOC 2000) Digital Object Identifier: 10.1109/IPCC.2000.887291, 2000, pp. 333-342.

Office Action for U.S. Appl. No. 13/935,758, mailed on Oct. 11, 2013, Niklas Karlsson, "System Identification, Estimation, and Prediction of Advertising-Related Data", 11 pages.

Non-Final Office Action for U.S. Appl. No. 13/370,852, mailed on Oct. 2, 2012, Niklas Karlsson et al., "System Identification Estimation and Prediction of Advertising-Related Data", 12 pages.

Office action for U.S. Appl. No. 13/370,852, mailed on Apr. 19, 2012, Niklas Karlsson et al., "System Identification Estimation and Prediction of Advertising-Related Data", 10 pages.

Office action for U.S. Appl. No. 14/194,985, mailed on Jun. 18, 2014, Karlsson et al., "System Identification, Estimation, and Prediction of Advertising-Related Data", 11 pages.

Phuc, et al., "Using NaA ve Bayes Model and Natural Language Prcessing for Classifying Messages on Online Forum", Research, Innovation and Vision for the Future, 2007 IEEE International COnference on Digital Object Identifier: 1 0.1109/RIVF2007.369164, 2007, pp. 247-252.

U, et al., "The Revenue Model of Online Third-Party Payment BAsed on Game Theory", Management of e-Commerce and e-Government, 2008. ICMECG '08., International Conference on Digital Object Identifier: 10.11 09/ ICMECG.2008.53, 2008, pp. 349-353.

Wong, et al., "Improving Text Classification Performance by Heuristics-Guided Exploration of Derived Features", Machine LEarning and Cybernetics, 2006 International Conference on Digital Object Identifier: 10.1109/ICMLC.2006,258468, 2006, pp. 3323-3328.

* cited by examiner

SYSTEM IDENTIFICATION, ESTIMATION, AND PREDICTION OF ADVERTISING-RELATED DATA

CROSS-REFERENCE TO RELATED TO RELATED APPLICATIONS

This application is a continuation of and claims priority to, commonly assigned co-pending U.S. patent application Ser. No. 14/194,985 entitled "System Identification Estimation and Prediction of Advertising-Related Data," filed on Mar. 3, 2014 which is a continuation of and claims priority to Ser. No. 13/935,758 entitled "System Identification Estimation and Prediction of Advertising-Related Data," filed on Jul. 5, 2013, which is a continuation of, and claims priority to U.S. Pat. No. 8,498,955, entitled "System Identification Estimation and Prediction of Advertising-Related Data," filed on Feb. 10, 2012, which is a continuation of, and claims priority to U.S. Pat. No. 8,121,963, entitled "System Identification Estimation and Prediction of Advertising-Related Data," filed on Oct. 5, 2010, which is a continuation of, and claims priority to U.S. Pat. No. 7,827,128, entitled "System Identification Estimation and Prediction of Advertising-Related Data," filed on Jun. 4, 2008, which is a continuation of, and claims priority to patent application Ser. No. 11/801,861, entitled "System Identification Estimation and Prediction of Advertising-Related Data," filed on May 11, 2007, the entire disclosure of which are incorporated by reference herein in their entireties.

FIELD OF THE INVENTION

This invention is generally related to advertising. This invention is more specifically related to system identification, estimation, and prediction of advertising-related data.

BACKGROUND

Since the early 1990's, the number of people using the World Wide Web has grown at a substantial rate. As more users take advantage of the World Wide Web, they generate higher and higher volumes of traffic over the Internet. As the benefits of commercializing the Internet can be tremendous, businesses increasingly take advantage of this traffic by advertising their products or services on-line. These advertisements may appear in the form of leased advertising space (e.g., "banners") on websites or advertisements on digital television, which are comparable to rented billboard space in highways and cities or commercials broadcasted during television or radio programs.

Before users browse to a particular web page, there is much unknown to the companies that might advertise on that page and to advertisers that may place advertisements on the companies' behalf Neither the companies nor the advertisers know how many users will browse to particular web pages and may or may not know of the number of competing advertisers that are interested in advertising on the same web page, and therefore do not know the volume of advertisements (the number of "impressions") they will be able to place. Further, neither know how many users will select or "click" on each advertisement or if "conversions," e.g., sales or signing up new users, will result from each display or impression of an advertisement or what the ratio of clicks to conversions may be.

Companies may be interested in impressions (e.g., if they are trying to increase awareness of a brand), clicks (e.g., if they are trying to provide more information about a product), or conversions (e.g., if they are trying to make sales or get new users to sign up for services, etc.). Companies may pay, on the other hand, based on impressions, clicks, or conversions, or a combination thereof, regardless of their interests. In addition to wanting to predict impressions, clicks, and conversions, one may want to predict other data related to the advertisement, such as the ratio of impressions to clicks or conversions or the ratio of clicks to conversions. Moreover, one may want to identify the relationship between control signals and advertisement related data.

It is accordingly an object of the invention to provide such predictions and other advertising-related data.

SUMMARY OF THE INVENTION

In accordance with the invention, a system, method, and apparatus for processing advertisement-related data are presented, which may include receiving data related to an aspect of an advertisement; modeling the aspect of the advertisement with a mathematical model, where the mathematical model includes a control-signal-related component, a control-signal-independent component, and an error component; updating each component of the mathematical model based on at least one of a particular control signal, the received data, and a previous state of at least one of the components to create an updated model; and predicting the aspect of the advertisement using the updated model. Some embodiments may further include the step of receiving one or more control signals related to the received data, where the one or more control signals include the particular control signal.

In some embodiments, the error component may be a multiplicative error component. The received data may include a number of times that the advertisement has been shown; a number of times that the advertisement has been selected by a user; a number of times that a conversion has occurred based on the advertisement; a probability that an impression will result in a selection; a probability that an impression will result in a conversion; or a probability that a selection by a user will result in a conversion.

The conversion may be a sale of an item, filling out a form, taking a survey, and watching a sequence of web pages. The probability that a selection by a user will result in a conversion may be a probability that selection by the user will result in a sale.

An advertisement may be an internet based advertisement, a digital television advertisement; an advertisement on a cell phone, or an advertisement on a personal digital assistant. The advertisement may also be one of a plurality of advertisements and one may choose which advertisement among the plurality of advertisements to display based at least in part on the prediction of the aspect of the advertisement. The choice of which advertisement to display may further be based on the control signal.

The mathematical model may be a log-linear model of the form $$g(u(k))^{\Omega^H_{l_u,m_u}(k)} e^{\Omega_{l,m}(k) + Cx_\varepsilon(k)},$$

a logit-linear model of the form $$\frac{g(u(k))^{\Omega^H_{l_u,m_u}(k)} e^{\Omega_{l,m}(k) + \varepsilon(k) + v(k)}}{1 + g(u(k))^{\Omega^H_{l_u,m_u}(k)} e^{\Omega_{l,m}(k) + \varepsilon(k) + v(k)}},$$

or any other appropriate model.

The mathematical model may be updated using an adaptive estimation scheme, a standard Kalman filter, an extended Kalman filter, or an unscented Kalman filter, or any other appropriate technique.

The error component may include an autoregressive moving average process. The control-signal-related component and the control-signal-independent component may include periodic functions, which may be sums of one or more sine or cosine functions of periods that are multiples of 24 hours.

The aspect may be a number of times that the advertisement is shown, a number of times that the advertisement is selected by a user, a number of times that a conversion occurs based on the advertisement, a probability that an impression results in selection by a user, a probability that an impression results in a sale; or a probability that a selection by a user results in a conversion.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
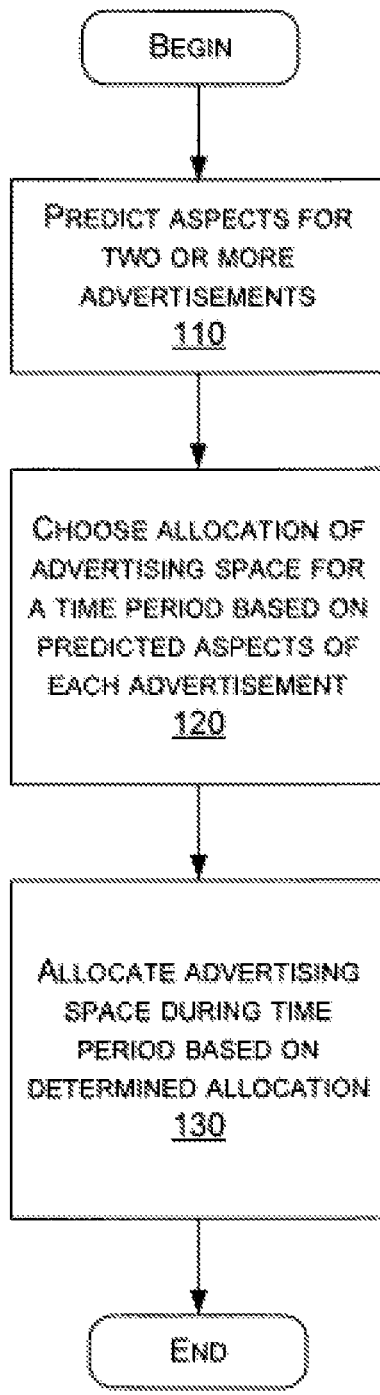
FIG. 1 is a flow chart that depicts the allocation of advertising space, consistent with embodiments of the present invention.
Figure 2:
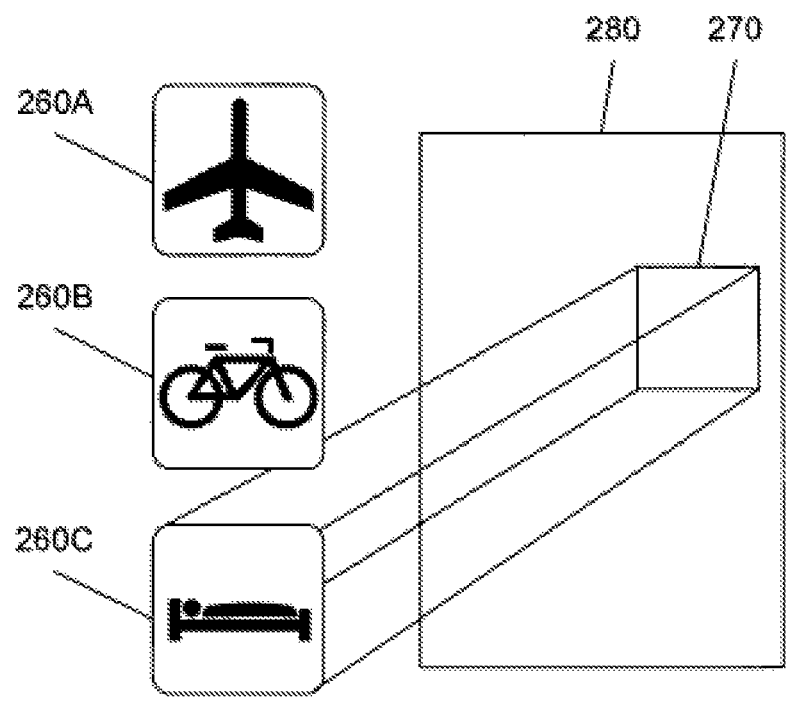
FIG. 2 is a diagram that depicts the allocation of advertising space, consistent with embodiments of the present invention.

FIG. 1 is a flow chart that depicts the allocation of advertising space, consistent with certain embodiments of the present invention. Companies may wish to place advertisements on the Internet, on digital television, cell phones, personal digital assistants, or any other appropriate device. As such, they may pay for the services of advertisers, who may place ads on their behalf. FIG. 2 is a diagram that depicts the allocation of advertising space, consistent with embodiments of the present invention. A particular advertiser (an advertising company that places advertisements on behalf of sponsoring companies) may have multiple advertisements 260A, 260B, and 260C that it could place in advertising space 270 on web page 280. Similarly, advertising space 270 could be available as part of a digital broadcast 280 of a digital television signal. The advertiser may, as depicted in step 110, predict one or more aspects (such as viewings of the advertisement, revenue, etc.) for two or more advertisements 260A, 260B, and 260C. In some embodiments, the advertiser may receive historical data for each advertisement 260A, 260B, and 260C, model aspects of the advertisement, update the models whenever new data related to the advertisement is received, and predict aspects of the advertisement, such as revenue, based on the models.

Once the revenue and/or other aspects for the advertisements are predicted in step 110, the advertiser may chose how to allocate advertising space 270 among advertisements 260A, 260B, or 260C in step 120. When determining the allocation of available advertising space among candidate advertisements, one may estimate certain aspects of advertising-related data. For example, one may want to predict or estimate volume information such as number of impressions, clicks, or conversions per time period. One may also want to predict or estimate performance information or success rates, such as impression-to-click ratio, impression-to-conversion ratio, or click-to-conversion ratio. The volume and/or performance information may be useful for determining how to allocate available advertising space among candidate advertisements. The choice of how to allocate advertising space 270 among advertisements 260A, 260B, or 260C may be based upon revenue, available budgets of the companies sponsoring advertisements 260A, 260B, and 260C, likelihood of an advertisement 260A, 260B, or 260C being selected by a user or "clicked," likelihood of an advertisement resulting in a successful "conversion" (e.g., making a sale or signing up a new user for services, etc.), a combination of those factors, or other appropriate factors. Step 120 may be performed before allocating each available advertising space 270 or may be performed once per time period (e.g., hourly or daily).

In step 130, advertising space is allocated in the manner determined in step 120. If steps 110 and 120 are performed before allocating each available advertising space 270, then, in step 130, the advertisement 260A, 260B, or 260C with the highest predicted revenue (or conversion rate, etc.) may be placed in available advertising space 270. If steps 110 and 120 are performed once during each time period, then the candidate advertisements 260A, 260B, and 260C may be distributed among available advertising spaces 270 during the time period based on the allocation determined in step 120. For example, if steps 110 and 120 are performed hourly, then the allocation determined in step 120 may indicate that twenty percent of available advertising spaces 270 during the time period should be filled by advertisement 260A, twenty-five percent by advertisement 260B, and the remaining fifty-five percent by advertisement 260C.

In some embodiments, there may be additional constraints on the allocation of available advertising space in step 130. For example, there may be a cap on the placement of advertisements 260A, 260B, and 260C during a particular time period based on the sponsoring company's requirements, such as desired distribution of advertisements over time or available budget. For example, a sponsoring company may not wish to spend over a certain amount on advertisements during the course of an advertising campaign or may wish to conform the placements of the advertisement to a particular temporal distribution, such as showing the advertisement at most 100 times per hour. The allocation of available advertising space 270 may also be dependent on control signals u for each advertisement 260A, 260B, and 260C.

Figure 3:
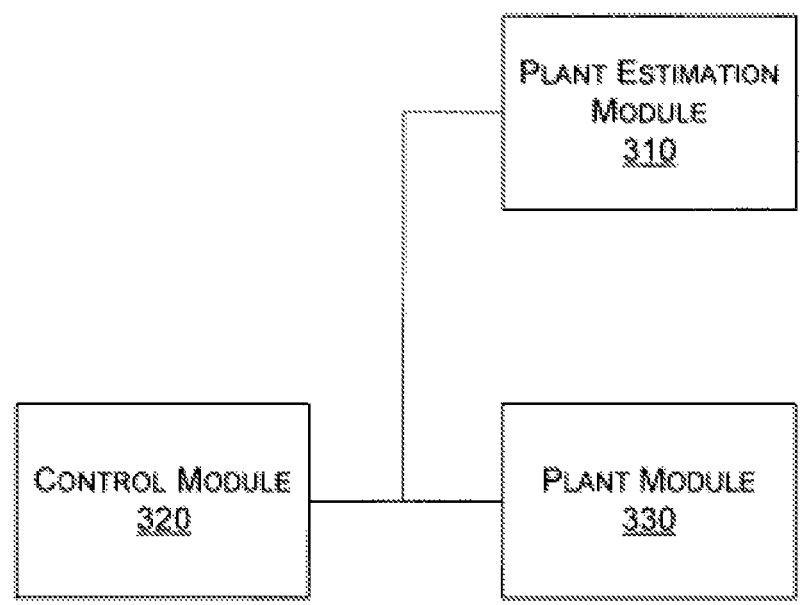
FIG. 3 is a block diagram depicting an apparatus and system for predicting and controlling advertising-related data, consistent with embodiments of the present invention.

FIG. 3 is a block diagram depicting an apparatus and system for predicting and controlling advertising-related data, consistent with embodiments of the present invention. As a preliminary matter, a plant may be a physical or logical system that takes one or more data streams as input and outputs one or more data streams. The plant may be modeled with a parametric mathematical model defined by a parameter vector x. For example, x may be parameters for a model that describes impressions, clicks, or conversions per time period; or impression-to-click ratio, impression-to-conversion ratio, or click-to-conversion ratio. A plant may take zero, one or more control signals u as input and output actual revenue, click volume, impression volume, etc. based on the placement of an Internet advertisement on $\hat{x}$ a series of web pages. Plant estimation module 310 may receive as input zero, one or more control signals u from control module 320 and volume and/or performance information from plant module 330. As described more herein, plant estimation module 310 may use the received information to produce $\hat{x}$, which is an estimate of the parameter vector x In some embodiments, there may be more than one plant estimation module 310 and each plant estimation module 310 may estimate a single set of parameters $\hat{x}$ for a single plant model. Therefore, there may be one plant estimation module 310 per volume or performance variable. Numerous plant estimation modules 310 may work in concert to help control an advertising system.

Plant estimation module 310 may receive as input the volume and/or performance signals that correspond to the plant it is attempting to estimate or model. For example, if plant estimation module 310 is estimating click-to-conversion ratio, then plant estimation module 310 may receive a click-to-conversion ratio signal from plant module 330 and may output parameters $\hat{x}$ related to the click-to-conversion ratio to control module 320. In some embodiments, plant estimation module 310 may additionally receive other signals. For example, if plant estimation module 310 is estimating click-to-conversion ratio, then it may receive click volume information and conversion volume information from plant module 330. In some embodiments, plant estimation module 310 may use the received signals as well as the control signals u to estimate parameters x.

Plant module 330 may take as input the control signal u from control module 320 and output the result of the plant, such as the signal corresponding to parameters $\hat{x}$. For example, if the plant is the click volume of a particular advertisement, then the plant module 330 may take as input a control signal u and attempt to control the click volume based on u. If there are multiple advertisements 260A, 260B, and 260C, for example, and the plant corresponds to the click volume of advertisement 260A, then the plant module 330 may attempt to increase or decrease the click volume (e.g., if u were increased or decreased, respectively) by increasing or decreasing the allocation of available advertising spaces 270 to advertisement 260A. If the plant is a performance ratio, such as impression-to-conversion ratio, then the plant module may attempt to increase the impression-to-conversion ratio by increasing the number of impressions that are shown on websites for which impressions are more likely to result in conversion and/or decrease the number of impressions shown on websites that are less likely to result in conversion. The opposite balance may be struck to decrease a performance ratio.

Plant module 330 may directly allocate available advertising spaces 270 when they become available or may be coupled to another device, module, or apparatus such as an ad server (not pictured) that allocates available advertising spaces 270 as they become available.

After available advertising space 270 has been allocated and information related to the relevant signal for plant module 330 becomes available (e.g., it may be hours or days after an advertisement 260A is displayed before conversion volume for advertisement 260A is available), the relevant signal is sent to plant estimation module 310. Plant estimation module 310 may use the relevant signal information to update one or more estimation models related to the relevant signal and send the updated parameter estimate $\hat{x}$ for the models to control module 320. Control module 320 may then alter control signal u in order to obtain the desired allocation for the related advertisement. For example, if control module 320 receives the updated parameter estimate $\hat{x}$ which model click volume for advertisement 260A, then control module 320 may alter the control signal u sent to plant module 330 in order to increase or decrease the click volume of advertisement 260A.

In certain embodiments, plant estimation module 310, control module 320 and plant module 330 may be combined or they may each be coupled to the other two modules. Each of plant estimation module 310, control module 320, and plant module 330 may also be coupled to one or more other devices, modules, or apparatuses (not pictured). The coupling discussed herein may include, but is not limited to, electronic connections, coaxial cables, copper wire, and fiber optics, including the wires that comprise a data bus. The coupling may also take the form of acoustic or light waves, such as lasers and those generated during radio-wave and infra-red data communications. Coupling may be accomplished by communicating control information or data through one or more networks to other data devices. In some embodiments, communication via coupling may be accomplished by sending information directly from one device, module, or apparatus to another device, module or apparatus. In other embodiments, communication may be accomplished via intermediate storage such as databases, flat files, binary files, registers, or one or more memories.

Each of the logical or functional modules described herein may comprise multiple modules. The modules may be implemented individually or their functions may be combined with the functions of other modules. Further, each of the modules may be implemented on individual components, or the modules may be implemented as a combination of components. For example, plant estimation module 310, control module 320, and plant module 330 may each be implemented by a field-programmable gate array (FPGA), an application-specific integrated circuit (ASIC), a complex programmable logic device (CPLD), a printed circuit board (PCB), a combination of programmable logic components and programmable interconnects, a single CPU chip, a CPU chip combined on a motherboard, a general purpose computer, or any other combination of devices or apparatuses capable of performing the tasks of modules 310, 320, or 330. In some embodiments, plant estimation module 310, control module 320, and plant module 330 may also include one or more memories that comprise a random access memory (RAM), a read only memory (ROM), a programmable read-only memory (PROM), a field programmable read-only memory (FPROM), or other dynamic storage device, coupled to a data bus for storing information and instructions to be executed by the module.

Figure 4:
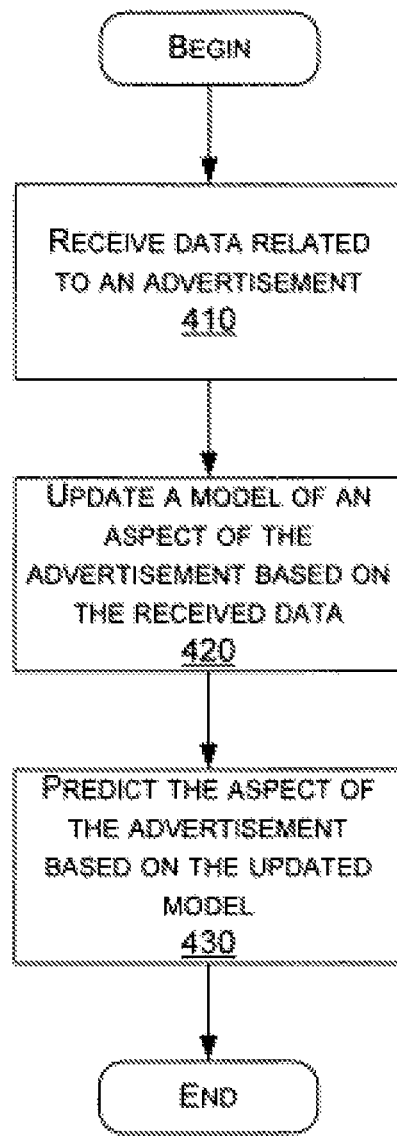
FIG. 4 is a flowchart depicting a method for predicting and estimating aspects of advertising-related data, consistent with embodiments of the present invention.

FIG. 4 is a flowchart depicting a method for predicting and estimating aspects of advertising-related data, consistent with embodiments of the present invention. In step 410, data related to an advertisement is received by, for example, plant estimation module 310. In step 420, the received data is used to update a model of an aspect of the advertisement, such as volume or performance. The updated model is then used by, for example, control module 320 in step 430 to predict the aspect of the updated model. For example, if one were interested in controlling the impression volume of an advertisement, then the data received in step 410 may include data related to impression volume and the value of a scalar control signal u over time for the advertisement. In step 420, the impression volume may be used (along with, e.g., an extended or unscented Kalman filter) to update a model of the impression volume, including how control signal u may affect impression volume. Then, in step 430, the updated model may be used to predict future impression volume. Furthermore, the predictions may be used to predict what scalar value to use for control signal $u_{desired}$ in order to get a desired impression volume (not pictured) and this control signal $u_{desired}$ may then be sent, e.g., from control module 320 to plant module 330, to attempt to control the plant such that it produces the desired impression volume.

In step 410, data related to an advertisement is received, and in step 420 that data is used to update a model of an aspect of the advertisement. The data received in step 410 may be related to any aspect of the advertisement. The data may include, for example, control signals, volume data for impressions, clicks, or conversions. The data may include performance ratios such as impression-to-click ratio, impression-to-conversion ratio, or click-to-conversion ratio. In some embodiments, any data that may be used to predict the aspect may be received in step 410. For example, if the aspect being modeled and updated in step 420 is impression volume, then the data received in step 410 may include impression data. If the aspect being modeled and updated in step 420 is conversion volume, then the data received in step 410 may include conversion volume, impression volume, and/or click volume. In some embodiments, for example, impression-to-conversion ratio and impression volume may be useful for helping predict conversion volume.

Figure 6:
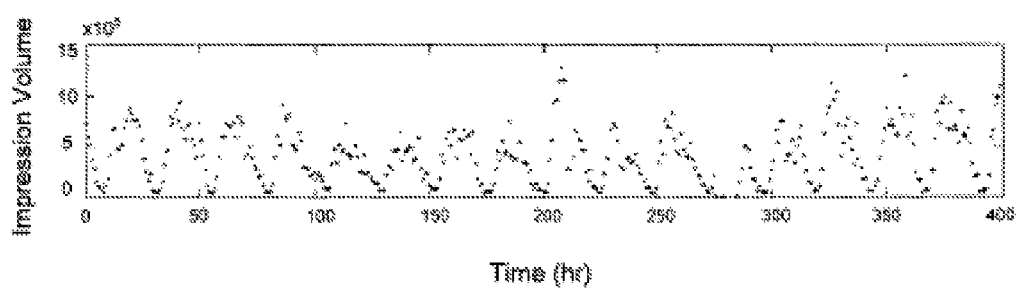
FIG. 6 is a chart of example impression volume data over time, consistent with embodiments of the present invention.

The data received in step 410 is used in step 420 to update a model of an aspect of the advertisement. The aspect modeled may be a volume measure (e.g., impressions, clicks, or conversions) or a performance measure (e.g., impression-to-click ratio, impression-to-conversion ratio, or click-to-conversion ratio). Volume and performance measures may comprise time-of-day and day-of-week features (Consider FIG. 6, which is a chart of example impression volume data over time, consistent with embodiments of the present invention. Each data point may represent the number of impressions for an advertisement in a given hour.) As such, the model may comprise a control-signal-independent component that has a truncated Fourier series, where 1 may be the number of terms in a 24-hour periodic component and m may be the number of terms in a 168-hour periodic component, and k may be the time period:

$$\Omega_{l,m}(k) = \beta_0 + \sum_{i=1}^{l} \beta_{24\,hr,i} \sin\left(\frac{2\pi i k}{24} + \varphi_{24\,hr,i}\right) + \sum_{i=l}^{m} \beta_{168\,hr,i} \sin\left(\frac{2\pi i k}{168} + \varphi_{168\,hr,i}\right)$$

where the 1+2(1+m) gain and phase parameters (the β's and φ's) define the control-signal-independent component of the model. The parameters may be represented by the following vector:

$$x_0 = [\beta_0 \beta_{24\,hr,1} \varphi_{24\,hr,1} \cdots \beta_{24\,hr,l} \varphi_{24\,hr,l} \beta_{168\,hr,1} \varphi_{168\,hr,1} \cdots \beta_{168\,hr,m} \varphi_{168\,hr,m}]^T$$

In other embodiments, components that are periodic to other than 24 and 168-hours may be used. Further, components that incorporate mathematical formulas or functions other than sine and cosine may be used.

$\Omega_{l,m}(k)$ and $x_0$ may correspond to plant behavior that is unrelated to the control signal u(k) (control-signal-independent). There may also be a control-signal-related component, $\Omega_{l_u,m_u}^u(k)$. Control signal u(k) may affect the plant with a time-of-day and/or day-of-week periodicity. This may be modeled using a truncated Fourier series defined in a similar manner as $\Omega_{l,m}(k)$. The control-signal-related component may be defined as follows:

$$\Omega_{l_u,m_u}^u(k) = \gamma_0 + \sum_{i=1}^{l_u} \gamma_{24\,hr,i} \sin\left(\frac{2\pi i k}{24} + \phi_{24\,hr,i}\right) + \sum_{i=1}^{m_u} \gamma_{168\,hr,i} \sin\left(\frac{2\pi i k}{168} + \phi_{168\,hr,i}\right).$$

The control-signal-related component may comprise $1+2(l_u+m_u)$ gain and phase parameters (the γ's and φ's), which may be represented by the following vector:

$$x_u = [\gamma_0 \gamma_{24\,hr,1} \phi_{24\,hr,1} \cdots \gamma_{24\,hr,l} \phi_{24\,hr,l} \gamma_{168\,hr,1} \phi_{168\,hr,1} \cdots \gamma_{168\,hr,m} \phi_{168\,hr,m}]^T$$

In other embodiments, components that are periodic to other than 24 and 168-hours may be used. Further, components that incorporate mathematical formulas or functions other than sine and cosine may be used.

Although $\Omega_{l,m}(k)$ and $\Omega_{l_u,m_u}^u(k)$ may be structurally similar, they may differ in the number of terms in the sums l, $l_u$, m, and $m_u$ and in the values of $x_0$ and $x_u$. In some embodiments, one or both of the control-signal-related component and the control-signal independent component may have no daily or weekly periodicity. In such embodiments, the corresponding parameter (l, m, $l_u$, and/or $m_u$) may be assigned the value zero. For example, if it is determined that the impact of control on the plant behavior is independent of the time-of-day and day-of-week, $l_u$, and $m_u$ may be set to zero and $\Omega_{0,0}^u(k)$ may in some embodiments be defined as follows:

$$\Omega_{0,0}^u(k) = \gamma_0.$$

Combining the control-signal-independent and control-signal-related components' parameters, one may have a vector x that represents a model of the aspect:

$$x = \begin{bmatrix} x_0 \\ x_u \end{bmatrix},$$

where x is a $2(1+l+m+l_u+m_u)$-dimensional column vector.

The model may also have an error component ϵ(k). ϵ(k) may be represented as a single parameter in x or it may comprise numerous parameters, each of which may be included in x. For example, in some embodiments, ϵ(k) may be represented by an Auto-Regressive Moving Average (ARMA) process. δ(k) may be approximated by an ARMA (p, q) process $$\epsilon(k)=a_1\epsilon(k-1)+\ldots+a_p\epsilon(k-p)+\mu(k)+b_1\mu(k-1)+\ldots+b_q\mu(k-q), \quad (1)$$

where $\mu(k)$ are samples from a white noise process of mean 0 and variance $\sigma_\mu^2$ where $$E[\mu(k)\mu(l)] = \begin{cases} \sigma_\mu^2, & k = l \\ 0, & k \neq l \end{cases}$$

In Equation (1), $\epsilon(k)$ is represented by a one-dimensional difference equation of order p. It may also be represented by a p-dimensional difference equation of order one (a state-space representation). For example, if $$s=\max(p,q+1),$$

$$a_j=0, \text{ for } j>p,$$

$$b_j=0, \text{ for } j>q, \text{ and}$$

$$a_0=0$$

it may follow that $$x_\epsilon(k+1) = Ax_\epsilon(k) + B\mu(k+1)$$

$$\varepsilon(k) = Cx_\epsilon(k)$$

where $$A = \begin{bmatrix} 0 & 1 & 0 & & 0 \\ 0 & 0 & 1 & & 0 \\ \vdots & \vdots & \vdots & \ddots & \vdots \\ 0 & 0 & 0 & & 1 \\ a_s & a_{s-1} & a_{s-2} & & a_1 \end{bmatrix} \in \mathbb{R}^{s \times s},$$

$$B = \begin{bmatrix} 0 \\ 0 \\ \vdots \\ 0 \\ 1 \end{bmatrix} \in \mathbb{R}^{s \times 1}$$

$$C = [b_{s-1} \quad b_{s-2} \quad \ldots \quad b_0] \in \mathbb{R}^{1 \times s}$$

where $\mu(k)$ may be white noise of mean zero and variance $\sigma_\mu^2$, and where A, B, and C may be constant matrices with dimensions $A \in \mathbb{R}^{s \times s}$, $B \in \mathbb{R}^{s \times 1}$, and $C \in \mathbb{R}^{1 \times s}$.

One may use the following log-linear model for volume n(k), where the volume may relate to impressions, clicks, or conversions:

$$\log(n(k))=\log(g(u(k)))\Omega_{l_u,m_u}^u(k)+\Omega_{l,m}(k)+\epsilon(k) \quad (2)$$

where $\epsilon(k) \sim ARMA(p, q)$

A plant system for a volume variable may be described with the following state-space equations:

$$x_\epsilon(k+1) = Ax_\epsilon(k) + B\mu(K+1) \quad (3)$$

$$n(k) = g(u(k))^{\Omega_{l_u,m_u}^u(k)} e^{\Omega_{l,m}(k)+Cx_\epsilon(k)}$$

where Equation (3) may be obtained by taking the exponential of Equation (2) and by replacing $\epsilon(k)$ with $Cx_{\epsilon(k)}$. The system behavior may be defined by the parameter vectors $x_0$, $x_u$, and the ARMA model (A, B, C), and by the noise variance $\sigma_\mu^2$. That is, the volume may be computable if the state, such as parameter vectors $x_0$ and $x_u$, the ARMA model (A,B,C) are known. Assuming u(k) is non-negative, then g(•) may vary depending on whether the control input is additive or multiplicative:

$$g(u(k)) = \begin{cases} \log(u(k)) & \text{if } u(k) > 0 \text{ and is multiplicative} \\ \text{sgn}(u(k))\log(|u(k)|+1) & \text{if } u(k) \text{ is additive} \end{cases}$$

In some embodiments, one can define g(u(k)) to allow u(k) to be negative.

The model for the performance rate may be similar to that constructed for the volume rates. The performance rate may be modeled with control-signal-independent, control-signal-related, and/or error components. One may chose, for example, to model the control-signal-independent and control-signal-related components with truncated Fourier series with 24 and 168 hour periodic harmonics. The error component $\epsilon(k)$ may be modeled with an ARMA process or as a single parameter in the system state x. For example, performance rate may be modeled by the following logit-linear model:

$$\text{logit}(p(k)) = \log(g(u(k)))\Omega_{l_u,m_u}^u(k) + \Omega_{l,m}(k) + \varepsilon(k)$$

$$\varepsilon(k) \sim ARMA(p, q)$$

$$p(k) = \frac{g(u(k))^{\Omega_{l_u,m_u}^u(k)} e^{\Omega_{l,m}(k)+\varepsilon(k)}}{1 + g(u(k))^{\Omega_{l_u,m_u}^u(k)} e^{\Omega_{l,m}(k)+\varepsilon(k)}}$$

Figure 5:
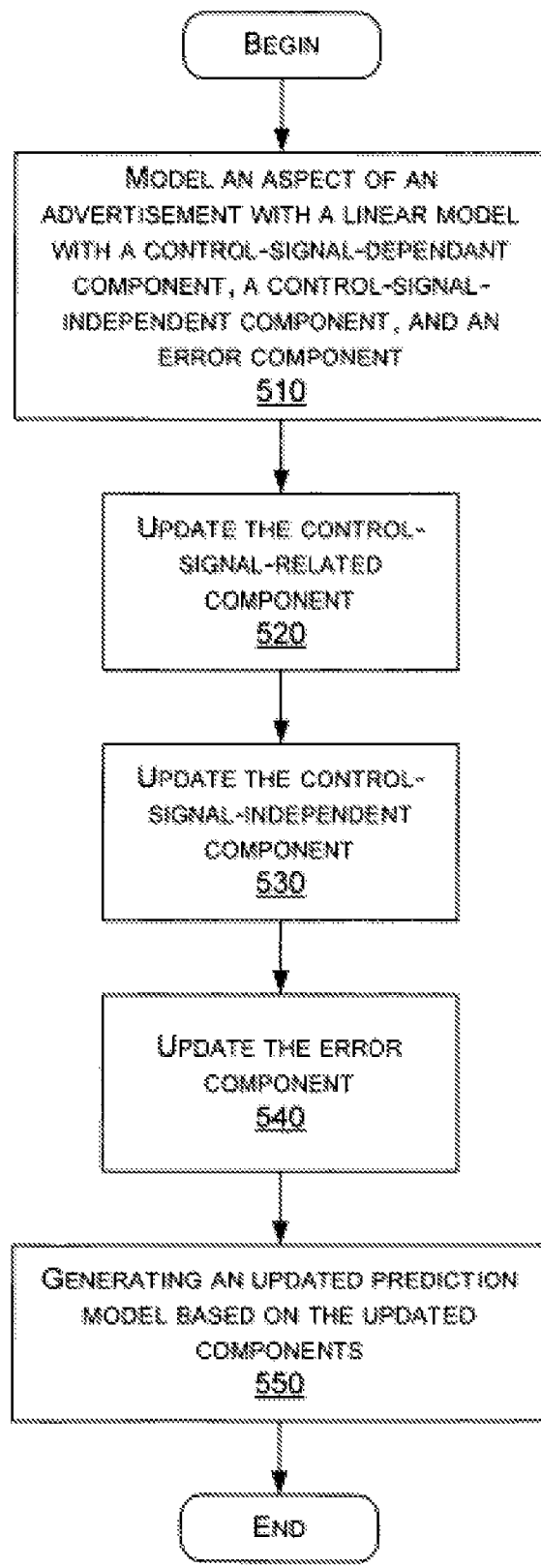
FIG. 5 is a flow chart of an exemplary method for updating a mathematical model of the aspect, consistent with embodiments of the present invention.

FIG. 5 is a flow chart of an exemplary method for updating a model of an aspect of an advertisement. Consistent with certain embodiments of the present invention, an aspect of an advertisement may be modeled using a mathematical model that has a control-signal dependant component, a control-signal independent component, and an error component. In steps 520, 530, and 540, the three components are updated. In step 550, an updated prediction model is generated based on the updated components. The updating steps 520, 530, and 540 may be performed separately or together as part of one or more operations and may be performed in sequence or simultaneously. In some embodiments, for example, steps 520, 530, and 540 may be performed together by using an adaptive estimation scheme or by updating all of the parameters of a particular type of Kalman filter, such as an unscented Kalman filter or an extended Kalman filter, where the parameters updated with the Kalman filter represent all of the parameters of the control-signal-related component, the control-signal-independent component, and/or the error component. In other embodiments, one or more of the components are updated separately via a different Kalman filter or by a different method. Other methods of updating components will be apparent to those skilled in the art from consideration of the specification and practice of the invention disclosed herein.

In some embodiments, in time period k (e.g., hour k), the volume (e.g., n(k)) or performance (e.g., p(k)) and the control signal u(k) used for hours 1 to k may be known. Since the sourced volume data (e.g., click volume or conversion volume) in hour k may not be known for hours after the advertisement is displayed, one may interpret hour k as the last hour for which there is sufficient volume or performance data. For example, after a certain duration of time, e.g., 1, 5, 10, 20, 24, 100, 168, or 376 hours after an impression is sourced, a sufficient percentage of the volume or performance data may be available. A sufficient percentage may be 50%, 80%, 90%, 95% or 99%, for example. In some embodiments, an analysis of historical data for other similar advertisements or campaigns may provide an estimate of what duration of time is likely to be needed before a sufficient percentage of sourced volume data has arrived.

An extended Kalman filter may be used to estimate the $2(1+l+m+l_u+m_u)$ component parameters and those of the error term $\epsilon(k)$, which may be combined to produce:

$$\begin{bmatrix} x_0 \\ x_u \\ x_\varepsilon \end{bmatrix}(k+1) = \begin{bmatrix} I & 0 & 0 \\ 0 & I & 0 \\ 0 & 0 & A \end{bmatrix}\begin{bmatrix} x_0 \\ x_u \\ x_\varepsilon \end{bmatrix}(k) + w(k)$$

$$\log(n(k)+1) = g(u(k))\Omega^u_{l_u,m_u}(k) + \Omega_{l,m}(k) + Cx_\varepsilon(k)$$

where the dimensions of the two identity matrices I may be $(1+2(l+m))\times(1+2(l+m))$ and $(1+2(l+m_u))\times(1+2(l_u+m_u))$, respectively and A may be an s×s matrix. Moreover, the noise vector w(k) may be a zero-mean, Gaussian white noise process incorporating the white noise process driving the $\epsilon(k)$ ARMA process and artificial noise in $x_0$ and $x_u$. Furthermore, v(k) may be a zero-mean, Gaussian white noise process describing the measurement uncertainty. In some embodiments:

$$\text{Cov}(w(k))=Q$$

$$\text{Cov}(v(k))=R$$

for all k, where Q and R are known covariance matrices.

In some embodiments, the measurement equation may be stated in terms of $\log(n(k)+1)$ rather than $\log(n(k))$ in order to avoid computational and numerical issues, such as the undefined nature of $\log(0)$.

A linearized measurement signal may be used to allow use of a Kalman filter, such as an unscented or extended Kalman filter. Such a measurement signal y(k) may be defined as follows:

$$y(k):=\log(n(k)+1).$$

x may denote the state vector of the extended Kalman filter:

$$x := \begin{bmatrix} x_0 \\ x_u \\ x_\varepsilon \end{bmatrix}.$$

F may represent the state transition matrix that relates x(k) and x(k+1) and may be defined as follows:

$$F := \begin{bmatrix} I & 0 & 0 \\ 0 & I & 0 \\ 0 & 0 & A \end{bmatrix}.$$

h(k,x(k),u(k)) may denote the nonlinear, time-varying measurement functional that relates the time index k, the state vector x(k) and the control signal u(k) (but not measurement noise) to the measurement y(k). As such, it may follow that:

$$h(k,x(k),u(k)):=g(u(k))\Omega_{l_u,m_u}^u(k)+\Omega_{l,m}(k)+Cx_\varepsilon(k).$$

As such, the state-space model may be written as:

$$x(k+1)=Fx(k)+w(k)$$

$$y(k)=h(k,x(k),u(k))+v(k).$$

The partial derivative of h(k,x(k),u(k)) with respect to x may be denoted H(k,x(k),u(k)) and may be given by the following row vector $$H(k,x(k),u(k)) := \frac{\partial h(k,x(k),u(k))}{\partial x}$$

$$= \left[\frac{\partial \Omega_{l,m}(k)}{\partial x_0}, g(u(k))\frac{\partial \Omega_{l,m}^u(k)}{\partial x_u}, C\right]$$

where the partial derivatives of $\Omega_{l,m}(k)$ with respect to $x_0$ and $\Omega_{l_u,m_u}^u(k)$ with respect to $x_u$ may be:

$$\frac{\partial \Omega_{l,m}(k)}{\partial x_0} = \begin{bmatrix} 1 \\ \sin\left(\frac{2\pi k}{24}+\varphi_{24hr,1}\right) \\ \beta_{24hr,1}\cos\left(\frac{2\pi k}{24}+\varphi_{24hr,1}\right) \\ \vdots \\ \sin\left(\frac{2\pi k}{24}+\varphi_{24hr,l}\right) \\ \beta_{24hr,l}\cos\left(\frac{2\pi k}{24}+\varphi_{24hr,l}\right) \\ \sin\left(\frac{2\pi k}{168}+\varphi_{168hr,1}\right) \\ \beta_{168hr,1}\cos\left(\frac{2\pi k}{168}+\varphi_{168hr,1}\right) \\ \vdots \\ \sin\left(\frac{2\pi mk}{168}+\varphi_{168hr,m}\right) \\ \beta_{168hr,m}\cos\left(\frac{2\pi mk}{168}+\varphi_{168hr,m}\right) \end{bmatrix}^T, \text{ and}$$

$$\frac{\partial \Omega_{l,m}(k)}{\partial x_u} = \begin{bmatrix} 1 \\ \sin\left(\frac{2\pi k}{24}+\phi_{24hr,1}\right) \\ \gamma_{24hr,1}\cos\left(\frac{2\pi k}{24}+\phi_{24hr,1}\right) \\ \vdots \\ \sin\left(\frac{2\pi l_u k}{24}+\phi_{24hr,l}\right) \\ \gamma_{24hr,l}\cos\left(\frac{2\pi l_u k}{24}+\phi_{24hr,l}\right) \\ \sin\left(\frac{2\pi k}{168}+\varphi\phi_{168hr,1}\right) \\ \gamma_{168hr,1}\cos\left(\frac{2\pi k}{168}+\varphi\phi_{168hr,1}\right) \\ \vdots \\ \sin\left(\frac{2\pi m_u k}{168}+\phi_{168hr,m}\right) \\ \gamma_{168hr,m}\cos\left(\frac{2\pi m_u k}{168}+\phi_{168hr,m}\right) \end{bmatrix}^T$$

One may estimate x recursively from the measured volume data. The estimate at time k may be denoted $\hat{x}$ and may be defined by $$\hat{x}(k)=E[x(k)|y(0),y(1),\ldots,y(k)]$$

One may initialize (e.g., when k=0) the Kalman filter as follows:

$$\hat{x}(0) = \begin{bmatrix} \log(n(0)+1) \\ 0 \\ \vdots \\ 0 \end{bmatrix}$$

$$P(0) = P_0(n(0))$$

where n(0) is the initial volume (at time k=0, e.g.) and $P_0$ may be an initial estimate of the covariance of the state estimate.

At each subsequent time period (e.g., k=1, 2, ... ), one may compute the state estimate propagation using the equation:

$$\hat{x}^-(k) = F\hat{x}(k-1),$$

compute the error covariance propagation using the equation:

$$P^-(k) = FP(k-1)F^T + Q,$$

compute the Kalman gain matrix using the equation:

$$G(k) = P^-(k)H^T(k,x(k),u(k))[H(k,x(k),u(k))P^-(k)H^T(k,x(k),u(k))+R]^{-1},$$

perform the measurement calculation using the equation:

$$y(k) = \log(n(k)+1),$$

update the state estimate using the equation:

$$\hat{x}(k) = \hat{x}^- + G(k)(y(k) - h(k,\hat{x}^-(k),u(k))),$$

and update the error covariance using the equation:

$$P(k) = (I - G(k)H(k,x(k),u(k)))P^-(k).$$

In order to update a performance model, a method similar to that described above for volume measurement may be used, except that the parameters that define p(k) may be updated based on received data, and the measurement signal may be defined as:

$$y(k) = \text{logit}(p(k)) = \log\left(\frac{p(k)}{(1-p(k))}\right) = g(u(k))\Omega^u_{i_u,m_u}(k) + \Omega_{l,m} + Cx_\varepsilon(k).$$

Returning to FIG. 4, the updated model produced in step 420 is used to predict the aspect of the advertisement (step 430). In some embodiments, plant estimation module 310 performs step 420 and generates parameters that define the model and sends these parameters to control module 320. Control module 320 may then use the parameters to predict the aspect of the advertisement. In some embodiments, additional processing (not depicted in FIG. 4) may be useful for controlling or attempting to control the aspect (e.g., attempting to control future volume or performance). As such, the additional processing may include predicting the effect that altering the control signal may have on the aspect and, based on that, choosing a control signal value that should result in a desired level for the aspect. For example, if the additional processing was used to control conversion volume, and it was predicted that a value of $u_{desired}$ for control signal u should result in the desired (or nearest to the desired) conversion volume, then the control value $u_{desired}$ may be used to attempt to control the plant associated with the advertisement.

In some embodiments, steps 410, 420, and 430 may deal with data related to groups of advertisements, such as campaigns. In such embodiments, the data received in step 410 may relate to the group of advertisements; the updated model produced in step 420 may model an aspect of the group of advertisements, such as volume or performance; and the aspect predicted in step 430 may be related to the group of advertisements. Similarly, in some embodiments, steps 510, 520, 530, 540, and 550 may deal with data related to groups of advertisements, such as campaigns. In such embodiments, step 510 may include modeling an aspect of the group of advertisements and steps 520, 530, and 540 may include updating the components of the model of the group of advertisements. Further, the aspect predicted in step 550 may be related to the group of advertisements. Whereas some of the discussion herein relates to individual advertisements, it should be obvious to one skilled in the art how to adapt the methods, apparatuses, and system presented to be used with groups of advertisements.

In some embodiments, the steps depicted in FIGS. 4 and 5 are performed by one or more of the modules depicted in FIG. 3. In some embodiments, plant estimation module 310, control module 320, or plant module 330 may individually perform every step 410, 420, 430, 510, 520, 530, 540, and/or 550. In other embodiments, plant estimation module 310, control module 320, or plant module 330 may perform fewer than all of step 410, 420, 430, 510, 520, 530, 540, and 550. For example, plant estimation module 310 may perform steps 410, 420, 510, 520, 530, and 540 and control module 320 may perform steps 430 and 550. In yet other embodiments, one or more of steps 410, 420, 430, 510, 520, 530, 540, and/or 550 are performed by modules, apparatuses, or devices distinct from modules 310, 320, or 330.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, under control of one or more computer systems configured with executable instructions, comprising:
    receiving data related to a performance of a first advertisement and data related to a performance of a second advertisement;
    predicting a future performance of the first advertisement and a future performance of the second advertisement based at least in part on
        the data related to the first advertisement,
        the data related to the second advertisement, and
        a campaign control component; and
    distributing the first advertisement and the second advertisement to one or more available advertising spaces based at least in part on
        a predicted future performance of the first advertisement, and
        a predicted future performance of the second advertisement.

2. The method of claim 1, further comprising adjusting a delivery time of the first advertisement based at least in part on the predicted future performance of the first advertisement.

3. The method of claim 1, wherein the predicted future performance is impression-to-click ratio.

4. The method of claim 1, further comprising determining a number of times that the first advertisement is to be shown and a number of times the second advertisement is to be shown.

5. The method of claim 1, wherein the data related to the first advertisement includes a number of times that the first advertisement has been selected by a user.

6. The method of claim 1, wherein the data related to the first advertisement includes a number of times that a conversion has occurred.

7. The method of claim 1, wherein the data related to the first advertisement includes a probability that an impression will result in a conversion.

8. The method of claim 1, wherein the data related to the first advertisement includes a probability that an impression will result in a conversion.

9. A system comprising:
one or more processors; and
one or more non-transitory computer-readable storage devices storing instructions which, when executed by the one or more processors, cause the one or more processors to:
receive data related to a performance of a first advertisement and data related to a performance of a second advertisement;
predict a future performance of the first advertisement and a future performance of the second advertisement based at least in part on
the data related to the first advertisement,
the data related to the second advertisement, and
a campaign control component; and
distribute a first advertisement and a second advertisement to one or more available advertising spaces based at least in part
a predicted future performance of the first advertisement, and
a predicted future performance of the second advertisement.

10. The system of claim 9, wherein the data related to the first advertisement includes a number of times that the first advertisement has been selected by a user.

11. The system of claim 9, wherein the data related to the first advertisement includes a number of times that a conversion has occurred.

12. The system of claim 9, wherein the data related to the first advertisement includes a probability that an impression will result in a conversion.

13. The system of claim 9, wherein the data related to the first advertisement includes a probability that a selection of the first advertisement by a user will result in a conversion.

14. The system of claim 9, wherein the predicted future performance includes a prediction of revenue generated by the first advertisement and the second advertisement.

15. The system of claim 9, wherein the delivery of the first advertisement and the second advertisement comprises delivering the first advertisement and the second advertisement to at least one of a cell phone, a television or a personal digital assistant.

16. One or more non-transitory computer-readable storage devices storing instructions which when executed by one or more processors, cause the one or more processors to perform operations comprising:
predicting a future performance of a first advertisement and a future performance of a second advertisement based at least in part on
data related to the first advertisement,
data related to the second advertisement, and
a campaign control component; and
allocating at least one of a first advertisement and a second advertisement to one or more available advertising spaces based at least in part on a predicted future performance of the first advertisement.

17. The one or more non-transitory computer-readable storage devices of claim 16, wherein the data related to the first advertisement includes a number of times that the first advertisement has been selected by a user.

18. The one or more non-transitory computer-readable storage devices of claim 16, wherein the data related to the first advertisement includes a number of times that a conversion has occurred.

19. The one or more non-transitory computer-readable storage devices of claim 16, wherein the data related to the first advertisement includes a probability that an impression will result in a conversion.

20. The one or more non-transitory computer-readable storage devices of claim 16, wherein the data related to the first advertisement includes a probability that a selection of the first advertisement by a user will result in a conversion.

* * * * *